March 15, 1932.  E. B. CARNS  1,849,740
WING OR AIRFOIL FOR AIRCRAFT
Filed April 9, 1927  3 Sheets-Sheet 1

Inventor,
Edmund B. Carns.
By his Attorney.
Ramsey Hoguet.

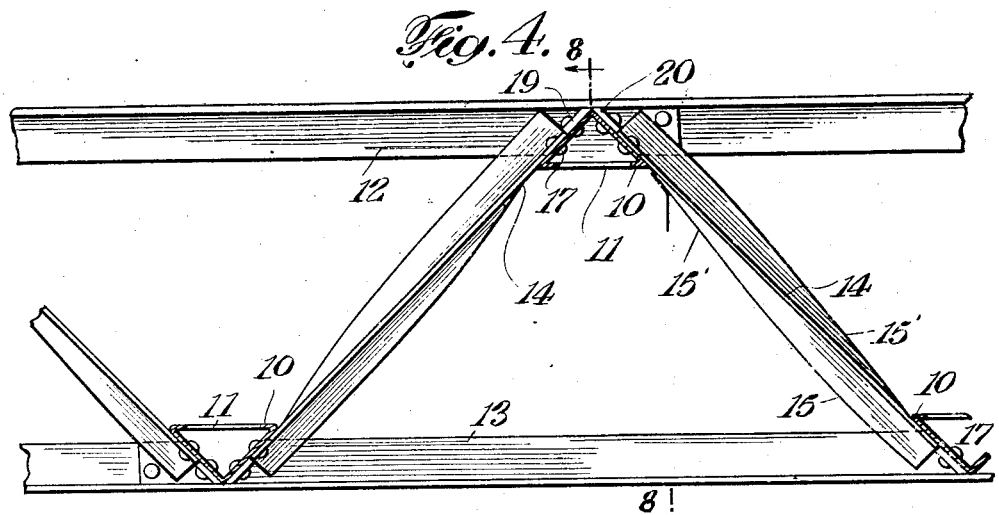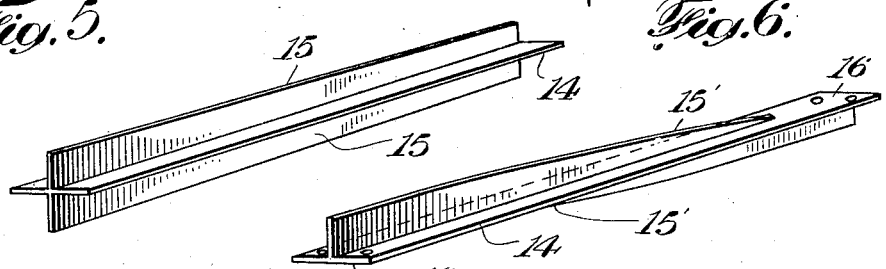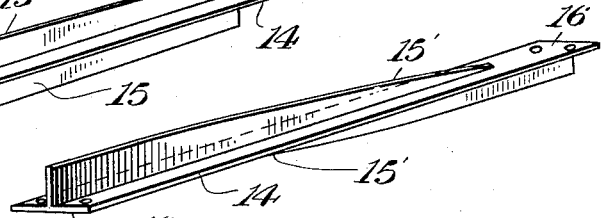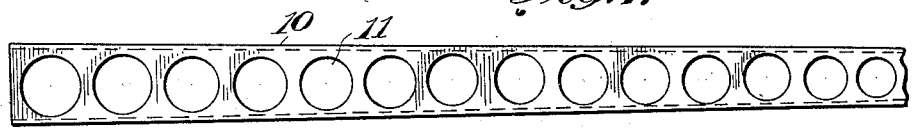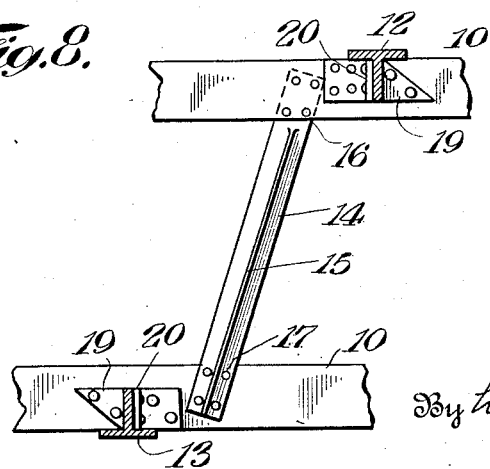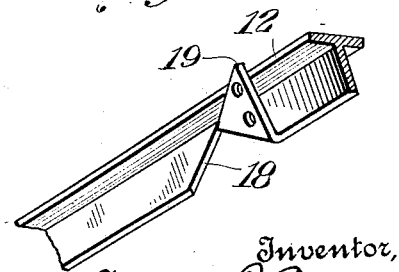

March 15, 1932. E. B. CARNS 1,849,740
WING OR AIRFOIL FOR AIRCRAFT
Filed April 9, 1927 3 Sheets-Sheet 3
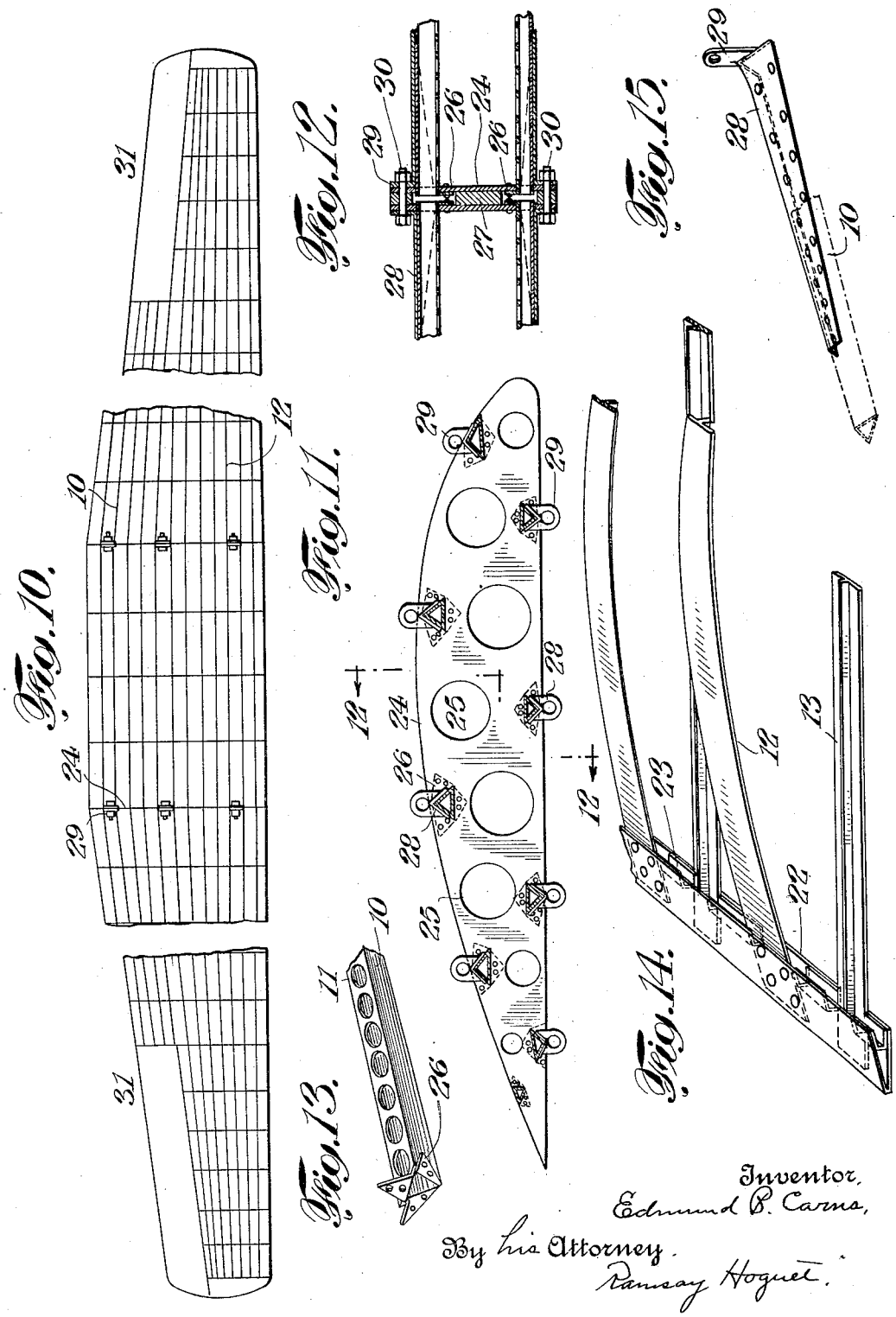
Inventor,
Edmund B. Carns,
By his Attorney,
Ramsay Hoguet.

Patented Mar. 15, 1932

1,849,740

UNITED STATES PATENT OFFICE

EDMUND B. CARNS, OF NEW YORK, N. Y., ASSIGNOR TO CAIRNS DEVELOPMENT COMPANY, OF WILMINGTON, DELAWARE, A CORPORATION OF DELAWARE

WING OR AIRFOIL FOR AIRCRAFT

Application filed April 9, 1927. Serial No. 182,210.

My invention relates to improvements in wings or air foils for aircraft and the object of my invention, generally, is to produce a very strong, light, simple wing having the parts disposed so that there is no waste of metal and so that a structure is made which will have unusual rigidity.

My invention is, also, particularly intended to produce a wing frame thickest in its middle portion and tapering to the tips and edges in which the essential parts of the wing structure also taper as well as the structure as a whole.

My invention is further intended to produce a structure having its parts of such shape that it is comparatively easy to provide for producing them in quantity so as to build the frame or wing on a production basis.

My invention is further intended to produce a wing for aircraft which can be made up in longitudinally separable sections and with means for easily and quickly connecting up these sections in such a manner as to make a wing of the desired size and of a strength equal to one which is not of sectional construction.

Reference is to be had to the accompanying drawings, in which similar reference characters represent corresponding parts in all views.

Figure 4 is an enlarged sectional elevation showing particularly the arrangement of the staggered spar members and their connecting braces.

Figure 5 is a detail perspective of a blank for forming one of the strut members.

Figure 6 is a view showing the blank of Figure 5 after it is shaped.

Figure 7 is a broken plan view of one of the spar members.

Figure 8 is a section of a line 8—8 of Figure 4.

Figure 9 is a detail perspective showing how a strut member can be shaped to facilitate its connection with a spar.

Figure 10 is a broken diagrammatic plan of the wing as a whole.

Figure 11 is a cross section through the wing showing the bulk head construction for uniting adjacent wing sections.

Figure 12 is a cross section on the line 12—12 of Figure 11.

Figure 13 is a broken perspective of a one end portion of a spar.

Figure 14 is a broken detail perspective view illustrating how the ribs of the wing are united at its trailing edge and Figure 15 is a perspective view showing the arrangement of some of the braces.

Figure 1:
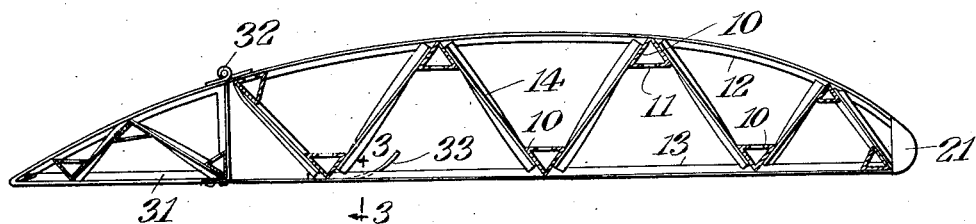
Figure 1 is a cross section of the wing embodying my invention.

Instead of having the spar members extend from top to bottom of the wing frame, I employ spar members 10, which are hollow and preferably of triangular cross section. These extend along the upper and lower parts of the wing structure and are in staggered relation as shown in Figure 1, that is to say, the upper and lower spars do not align vertically.

These spar members can conveniently be made from sheet metal which is sufficiently stiff when shaped as specified and the spars taper from the center toward the ends and the inner flat surfaces are lightened by numerous perforations 11 which can be made large enough to permit a tool being inserted through them to facilitate riveting operations when the ribs, spars and struts are fastened together.

Figure 2:
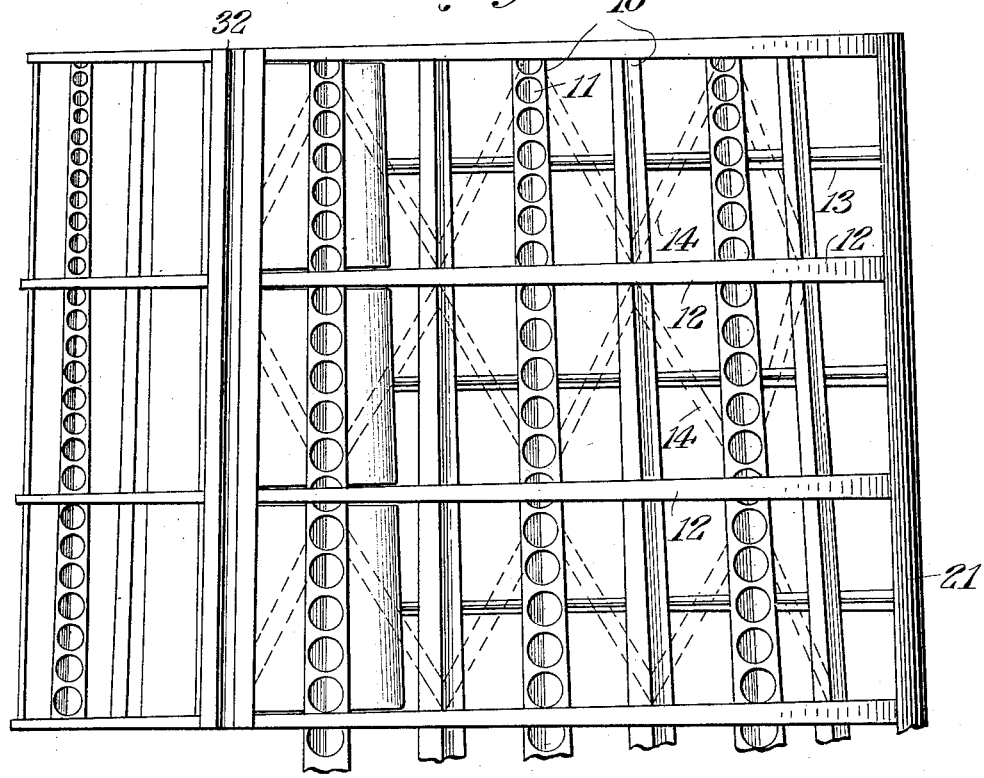
Figure 2 is a broken plan view with the cover removed.

The spars connect with the transverse ribs 12 and 13 which are arranged at the upper and lower parts of the wing frame; these are shaped to give the frame its desired transverse contour. They are preferably of T metal and they taper from the front edge of the wing to the rear or trailing edge as shown clearly in Figure 2.

The wing structure is trussed or braced by the struts 14 which connect the upper and lower spar members and, also, brace to the ribs.

These struts are preferably made from a blank like that shown in Figure 5 having the flange member 14 and web members 15 at right angles thereto. This makes a strong, standard construction as the metal of this shape can be bought in the open market. These struts are cut to the right length and the web members 15 are cut off or tapered toward the ends, the web on one side being tapered at one of the struts and the opposite web being tapered at the opposite end of the strut as shown at 15' in Figure 6 and this leaves plain face portions 16 on opposite sides and ends of the strut to facilitate its connection with the spar members 10.

Thus, it will be seen that these struts can have their end portions laid flatly and firmly against upper and lower spars 10 as shown in Figures 4 and 8 and the struts can be securely riveted as at 17 or otherwise fastened to the spars.

This makes a very cheap, simple and strong connection.

The ribs 12 and 13 are connected to the spars at points adjacent the strut connections and to afford a very simple and yet secure attachment between the ribs and spars, each rib may, at the point where it is to connect with the spar, be cut into as at 18 at Figure 9 and the part formed by the cut turned up to make a tongue 19.

Thus, the recess 18 will sit on or receive the apex of a spar 10 and the tongue 19 will lie against the spar surface to which it can be securely riveted or otherwise fastened.

On the side of a rib opposite to that with which the tongue 19 connects, an angle brace 20 may be applied and secured to both the rib and spar as in Figure 8.

The frame work of the wing may be provided with a suitable nose piece 21 and at its trailing edge, the ribs 12 and 13 are brought into the same horizontal plane and these enter an essentially V-shaped edge piece 22 (see Figure 14) to which the ends of the ribs may be firmly riveted and the adjacent rib ends are spaced by the spacing clips 23 which are shaped to enter the member 22 and extend between the adjacent rib ends.

These clips 23 serve, therefore, the double purpose of spacing members and of stiffening the member 22. If the wing is to be of large size, it can be made up in longitudinally separable sections as shown in Figure 10. In such case, it is, of course, necessary to provide means for connecting these sections together in such a way that the plane will be rigid and the connections safe.

To provide for this, I preferably arrange at the meeting ends of the several sections bulk-heads 24 which can be of sheet metal and which are perforated as at 25 to lighten them. These bulk-heads are of the transverse contour of the wing at the place where they occur and the adjacent spars 10 of the wing sections extend through complementary holes in each bulk-head.

The spars can be slit at the corners and after a spar has been pushed through the complementary hole in the bulk-head, the split portion can be turned up to form wings or gussets 26 and these can be clinched upon the bulk-heads and secured by riveting or otherwise as shown in Figures 11 to 13.

A packing piece or filler 27 to deaden sound and afford necessary resilience is preferably placed between adjacent bulk-heads 24 as shown best in Figure 12 and as a further means of bracing the connected wing sections, I employ elongated braces 28—see Figure 15—which are preferably tapered, are angular in cross section and are in the form of saddles which fit nicely upon the adjacent spars and extend outward on the spars to the extent to make a very strong connection.

The saddles or braces 28 can then be riveted or otherwise fastened to the spars. The saddles 28 have each at their wider ends, outwardly extending lugs 29 and when the two bulk-heads 24 are to be fastened together, thus uniting the adjacent wing sections, bolts 30 or equivalent fastening elements can be extended through the lugs 29, the corresponding part of the bulk-heads and the filler 27 as shown in Figure 12, thus making the connection between the adjacent wing sections especially secure.

I have shown the wing provided with ailerons 31 which are arranged as usual in wing structures so far as their general disposition is concerned and these may be braced and made up like the rest of the wing as shown in Figure 1.

The ailerons are hinged as at 32 so that they may be moved upward or downward but as I have not shown the means for actuating them, there being nothing novel in this, any usual or preferred actuating means can be used.

Figure 3:
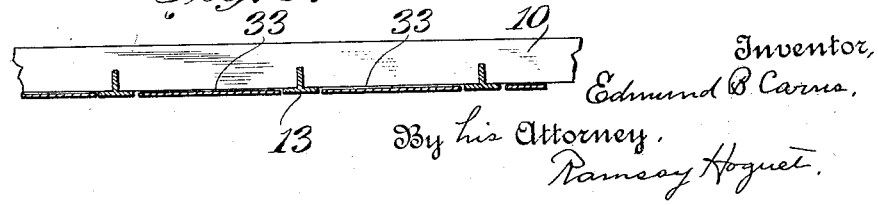
Figure 3 is a section on the line 3—3 of Figure 1.

One novel feature of the aileron arrangement, however, is that each aileron is provided with closure plates 33 which fit between the ribs 13 as shown in Figure 3 and are tensioned so as to turn inward and retain their position against the nearest spar 10 so that the aileron is swinging upward or downward, each plate 33 serves as an air foil closure for the openings that might otherwise be made in the wing structure by moving the ailerons.

From the description which I have given and the drawings, it will be seen that the wing structure which I have described can be made of standard metal parts, that these are tapered and disposed to make a very strong wing with light materials and that it is possible to make a wing of a single section or plurality of sections with equal advantage.

I have not referred to a covering for the wing and while any skin or cover can be used, I intend and prefer to use as a cover a material of my own invention which is a wire mesh body having a coherent sheet surface on one side. At any rate, a flexible metal fabric is preferable to any other but it will be seen that the invention lies in the wing construction, generally, and not in the covering.

What I claim is:

1. A wing for air craft having tubular flat sided spar members near the upper and lower parts, said spars being progressively tapered toward the tips with the upper and lower spars in staggered relation, struts or braces connecting the upper and lower spars, each brace being attached at its ends to the spar members, and cross ribs recessed to fit upon the spars and having means for attachment to the spars, said ribs being also attached to said braces.

2. In wing construction for air craft, the combination, with staggered spars, of the cross ribs recessed to receive and fit over the spars and with tongues adjacent the recesses to connect the spars and ribs and turned up from the metal of the ribs.

3. In air craft wing construction, the combination with the upper and lower spars of the struts or braces connecting the spars, each strut comprising a central plane body or flange with oppositely tapering webs on opposite sides thereof.

4. In air craft wing construction, the combination with upper and lower spars having flat sides, of the struts or braces connecting the upper and lower spars, each strut having at the end portion a flat plain surface to fit against the flat side of a spar and having oppositely tapering webs on opposite sides rising from the central plane body part thereof.

5. In air craft wing construction, the combination with the staggered upper and lower ribs merging into line at the trailing edge of the wing, of a recessed member fitting over the trailing edges of the ribs, and clips fitting in the said recessed member between the rib ends, thereby bracing said recessed member and spacing the rib ends.

6. A wing for air craft comprising longitudinally separable section, each section having spars near the upper and lower parts thereof, a bulk head next an adjoining section, means comprising flanges on the spars lying against the bulkheads for locking the spars and bulk heads together, reinforcing braces connecting the spars and bulk heads and means for fastening adjacent bulk heads together.

7. A wing for air craft comprising longitudinally separable sections having bulkheads near their meeting parts, upper and lower tubular spars having outturned flanges connected to the bulkheads, reinforcing saddles or braces secured to the spars and having outwardly extending lugs, and means for fastening together the complementary lugs of adjacent sections.

8. In air craft wing construction, the combination with the separable sections of the wing and the upper and lower spars of said sections, of saddles or braces extending lengthwise of the several spars and seating thereon near the ends of the section, said saddles or braces having outwardly extending complementary lugs.

9. In air craft wing construction, the combination with the wing having spaced ribs on the under side, of the aileron having air foil plates extending from the lower and inner part of the aileron between the ribs to close the openings therebetween.

10. A wing for air craft having spar members of triangular cross section at the upper and lower parts of the wing, and with the apexes of the spars outermost and ribs of T cross section with webs cut to form recesses fitting on the apexes of the spar members, with the web on one side of each rib turned out to form a flange adapted to lie against and be fastened to the side of the spar member.

11. A wing for air craft having at the upper and lower parts spars of triangular cross section, with the apexes of the triangular spars outermost, contour ribs traversing the spars and seating on the apexes of the spar members, and braces with webs rising therefrom, the braces having flat end portions fitting against and attached to the spar members, and with their web portions fitting against and attached to the ribs.

12. A wing for air craft having tubular tapering staggered spar members of triangular cross section at the upper and lower parts of the wing, with the apexes of the top spar members uppermost, and with the apexes of the bottom spar members downward, contour ribs crossing and seating on the apexes of the upper and lower members, and struts or braces connecting the upper and lower spar members and ribs.

13. In a wing for aircraft, upper and lower contour rib members in staggered relation, said contour rib members being braced solely by elements extending longitudinally of the wing.

14. A wing for aircraft having upper and lower spars in different horizontal planes, upper and lower transverse contour ribs in staggered relation resting on said spars, bracing members, said ribs being braced solely by bracing members having components extending longitudinally of the wing.

15. A wing for aircraft having upper and lower spars in staggered relation, upper and lower transverse contour ribs in staggered relation resting on said spars, bracing members, said ribs being braced solely by bracing members having components extending longitudinally of the wing.

16. A wing for aircraft having upper and lower spar members in different horizontal planes and in staggered relation, upper and lower transverse ribs in staggered relation connected to the upper and lower spar members, and internal braces for the spar members and ribs, said braces being fastened at substantially the points where the spar members and the ribs meet.

17. A wing for aircraft having spars disposed near the upper and lower parts of the wing, the upper and lower spars being in staggered relation, struts or braces connecting and attached to the upper and lower spars, and transverse ribs in staggered relation connected to the spars at substantially the point where the spar members and braces meet.

In testimony whereof, I have signed my name to this specification this 7th day of April, 1927.

EDMUND B. CARNS.